United States Patent [19]

Yui et al.

[11] Patent Number: 5,283,100
[45] Date of Patent: Feb. 1, 1994

[54] MOLDING FOR AUTOMOBILE WINDOWS

[75] Inventors: Toshio Yui, Komae; Yoshimasa Yamamoto, Ichihara; Naohisa Miyakawa, Nagareyama, all of Japan

[73] Assignees: Dupont-Mitsui Polychemicals Co., Ltd., Tokyo; Tokiwa Chemical Industry Co., Ltd., Chiba, both of Japan

[21] Appl. No.: 903,480

[22] Filed: Jun. 24, 1992

[51] Int. Cl.$^5$ ............................ E06B 3/00; E06B 3/62
[52] U.S. Cl. ..................... 428/120; 428/31; 428/217; 296/93; 52/400; 52/403
[58] Field of Search .......... 428/120, 217, 31; 296/93; 52/400, 403

[56] References Cited

U.S. PATENT DOCUMENTS 4,458,459  7/1984  Irrgang ............................. 52/400
4,787,668  11/1988  Kawase et al. .................... 52/400

Primary Examiner—Alexander S. Thomas
Attorney, Agent, or Firm—Sherman and Shalloway

[57] ABSTRACT

Disclosed is a molding a molding for mounting a window glass on the window opening of an automotive body, said molding for automobile windows comprising a flexible leg portion, an upper flange portion which extends toward both sides at an upper part of the leg portion and supports the edge portion of the glass, upper lip portions that form both tips of said upper flange portion, and lower lip portion which are adhered to the window opening of the automotive body, wherein at least the upper lip portions and the lower lip portions of said molding are formed by using a thermoplastic olefinic elastomer or a composition of said elastomer and an olefin-ethylene type unsaturated carboxylic acid copolymer or a salt thereof having a hardness in compliance with JIS A of from 50 to 80, said leg portion and said flange portion are formed by using a blend of the thermoplastic olefinic elastomer and the olefin-ethylene type unsaturated carboxylic acid copolymer or a salt thereof, said blend having a hardness in compliance with JIS A of from 75 to 95, the surfaces of the upper lip portions are covered with a layer which contains the olefin-ethylene type unsaturated carboxylic acid copolymer or a salt thereof and having a thickness of 1 to 50 μm and a hardness in compliance with JIS A of greater than 85, and at least the lower surfaces of the lower lip portions are formed by using the olefin-ethylene type unsaturated carboxylic acid copolymer or a salt thereof or a polymer composition containing them.

7 Claims, 3 Drawing Sheets

MOLDING FOR AUTOMOBILE WINDOWS

BACKGROUND OF THE INVENTION

1. Field of the Invention

The present invention relates to a molding for automobile windows and, more particularly, to a molding for automobile windows which comprises an olefinic polymeric material exhibiting excellent softness, resistance against scratches, surface appearance and is capable of being easily mounted on the body.

2. Description of Prior Art

At present, a polyvinyl chloride has exclusively been used as a molding material for automobile windows. Under the circumstances of reducing the weight for improving fuel efficiency, recycling the materials from the environmental point of view, and preventing the generation of corrosive gases at the time of burning that are demanded in recent years, however, it has been urged to replace the polyvinyl chloride by an olefinic polymer. In practice, however, excellent properties possessed by the polyvinyl chloride cannot readily be obtained from a single olefinic polymer. For instance, a polyolefinic thermoplastic elastomer has been known to exhibit softness comparable with that of the polyvinyl chloride. When used as the molding material, however, the polyolefinic thermoplastic elastomer tends to be easily scratched and fails to exhibit luster to a sufficient degree. Moreover, the polyolefinic thermoplastic elastomer cannot be adhered with an adhesive and, hence, cannot be fastened to the automotive body and, further, loses appearance when a wax remover (a mixture of hot water and kerosene) is applied thereto at the time of removing anti-corrosion wax from the car body. When the olefinic polymer of a hard quality is selected by giving importance to resistance against scratches and luster of the molding, new problems arouse in that it becomes difficult to mount the mold and portions that come in contact with the mold tend to be scratched.

U.S. Pat. No. 4,351,864 to Giannakidis discloses an automotive molding having a body of an ionomer resin, a cover layer comprising an ionomer resin, and a film coated on both sides with metal and sandwiched between and bonded to said body and said cover layer. The above molding for automobile windows is excellent in that it is attractive and has bright metallic appearance, but still has some of the aforementioned problems.

SUMMARY OF THE INVENTION

The object of the present invention therefore is to provide a molding for automobile windows comprising an olefinic polymer which has a sufficient degree of softness, which can be easily mounted, and which exhibits improved resistance against scratches and improved surface luster.

Another object of the present invention is to provide a molding for automobile windows which can be excellently adhered to the automotive window frames and which excellently withstands the application of wax removers.

According to the present invention, there is provided a molding for mounting a window glass on the window openings of an automotive body, said molding for automobile windows comprising a flexible leg portion, an upper flange portion which extends toward both sides at an upper part of the leg portion and supports the edge portion of the glass, upper lip portions that form both tips of said upper flange portion, and lower lip portions which are adhered to the window opening of the automotive body, wherein at least the upper lip portions and the lower lip portions of said molding are formed by using a thermoplastic olefinic elastomer or a composition of said elastomer and an olefin-ethylene type unsaturated carboxylic acid copolymer or a salt thereof having a hardness in compliance with JIS A of from 50 to 80, said leg portion and said flange portion are formed by using a blend of the thermoplastic olefinic elastomer and the olefin-ethylene type unsaturated carboxylic acid copolymer or a salt thereof, said blend having a hardness in compliance with JIS A of from 75 to 95, the surfaces of the upper lip portions are covered with a layer which contains the olefinethylene type unsaturated carboxylic acid copolymer or a salt thereof and having a thickness of 1 to 50 $\mu$m and a hardness in compliance with JIS A greater than 85, and at least the lower surfaces of the lower lip portions are formed by using the olefin-ethylene type unsaturated carboxylic acid copolymer or a salt thereof or a polymer composition containing them.

DETAILED DESCRIPTION OF THE PREFERRED EMBODIMENTS

Figure 1:
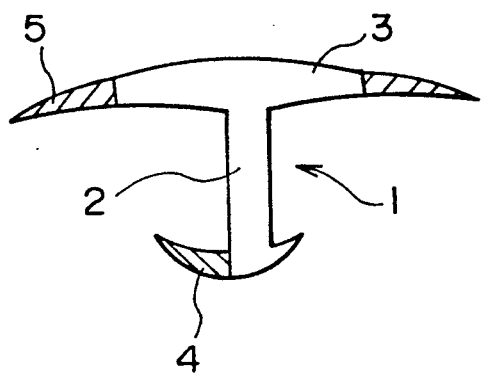
FIG. 1 is a sectional view of a conventional molding for automobile windows of black finish.
Figure 2:
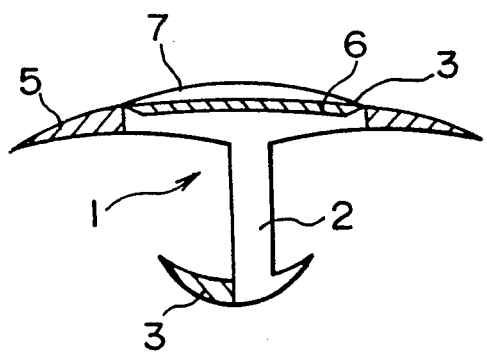
FIG. 2 is a sectional view of a conventional molding for automobile windows of luster finish (metallic appearance finish)

FIGS. 1 and 2 illustrate in cross section the structures of typical moldings for windows according to the prior art, wherein FIG. 1 shows the molding of black finish. The molding 1 comprises a flexible leg portion 2, an upper flange portion 3 which extends toward both sides at an upper part of the leg portion to support the edge portion of the glass, upper lip portions 5 which form both tips of the flange portion 3, and lower lip portions 4 which extend toward both sides at a lower part of the leg portion so as to be supported by the window opening. The molding 1 is made of a soft polyvinyl chloride blended with carbon black. Lip portions 5 at the ends of the flange have a thickness that reduces toward the tips thereof, and may be made of a material softer than other part of the flange portion, such as a polyvinyl chloride which is softer than the above-mentioned polyvinyl chloride. The lower lip portion 4 is secured by adhesion to the flange of an opening in the body.

FIG. 2 shows the molding of metallic appearance finish, which has the same structure as the molding of FIG. 1 except that a metal-deposited film 6 is inserted in the upper part of the black-finished molding and a coating layer 7 of a transparent resin such as an ionomer resin is formed on the surface thereof.

According to the present invention, at least the upper lips and the lower lips of the molding are formed by using a thermoplastic olefinic elastomer or a composition of this elastomer and an olefin-ethylene type unsaturated carboxylic acid copolymer or a salt thereof.

Generally speaking, the thermoplastic olefinic elastomer used in the present invention contains soft segments composed of an olefinic rubber such as an ethylene propylene rubber and hard segments composed of an olefinic resin such as a polypropylene or a polyethylene, the segments composed of the olefinic rubber usually being at least partly crosslinked.

The olefinic elastomer used in the present invention can be melt-molded such as by extrusion molding yet exhibits excellent softness, rubber-like elasticity, small permanent distortion, and excellent weatherability, heat resistance and resistance against the chemicals. In addition, the olefinic elastomer has a specific gravity which is smaller than 1, contributing to reducing the weight compared with those which use the conventional vinyl chloride resin.

The lips of the molding may be composed of the above-mentioned olefinic elastomer alone or may be composed of a blend thereof with an olefin-ethylene type unsaturated carboxylic acid copolymer or a salt thereof that will be described later. Use of the blend of the acid- or salt-modified olefin polymer gives an advantage of improved adhesiveness to the coating layer or to the adhesive agent for securing to the window opening as will be described later.

It is important that the olefinic elastomer or a blend thereof used for forming the upper lips and lower lips of the present invention has a hardness (at 23° C.) in compliance with JIS Japanese Industrial Standard) K-6301 type A that lies within a range of from 50 to 80 and, particularly, from 55 to 75. If the hardness of the mold becomes smaller than 50, it becomes difficult to reliably hold the windows glass and the mounting on the window opening lacks strength. If the hardness of the mold becomes greater than 80, on the other hand, the mold loses softness and flexibility, makes it difficult to carry out the operation of mounting on the window opening, and causes the body or the glass to be scratched at the time of mounting and further produces abnormal noise during the running.

According to the present invention, the surfaces of the upper lip portions are covered with a polymer layer which contains an olefin-ethylene type unsaturated carboxylic acid copolymer or a salt thereof and which has a hardness in compliance with JIS A of greater than 85 and, particularly, greater than 90. The olefin polymer modified with the acid or the salt thereof not only exhibits excellent adhesiveness to the thermoplastic olefinic elastomer that forms the mold but also imparts excellent luster to the surface of the mold that is located on the outer surface of the automobile and further imparts scratch resistance. Moreover, the acid- or salt-modified olefin polymer excellently withstands the application of a wax remover compared with other olefinic polymers. It is important that the covering layer of the polymer has a JIS A hardness of greater than 85 and, particularly, greater than 90. If the hardness is smaller than the above range, the scratch resistance, luster and resistance against the wax remover become smaller than those of the case of the present invention.

As for the resistance against the wax remover, properties of the olefin-ethylene type unsaturated carboxylic acid copolymer or a salt thereof are not sufficient if the operation conditions become severe. In such a case, it is recommended to blend the thermoplastic olefinic elastomer to such an extent that the resistance against scratches and luster are not impaired. Or, it is also effective to use a complex compound of a salt of the olefin-ethylene unsaturated carboxylic acid copolymer with a polyamide oligomer.

It is further important that the covering layer of the acid- or salt-modified olefin polymer of the present invention has a thickness of from 1 to 50 μm and, particularly, from 5 to 30 μm. If the thickness of the covering layer is smaller than the above range, the covering layer fails to exhibit a sufficiently great durability and loses the above-mentioned excellent properties with the lapse of time. If the thickness of the covering layer is greater than the above range, on the other hand, the molding loses softness, flexibility and cushioning property, and the operability for mounting on the window opening is deteriorated, too.

In the present invention, furthermore, at least the lower surfaces of the lower lips are formed by using the olefin-ethylene type unsaturated carboxylic acid-containing copolymer or a composition which contains this copolymer. Use of this copolymer helps increase the adhesiveness of the molding to an adhesive agent for fastening to the window opening of the body, for example, to an urethane adhesive agent or the urethane sealant owing to the presence of a functional group of carboxylic acid or a salt thereof.

The acid- or salt-modified olefin polymer and the blend thereof may form the surfaces only of the lower lip portions. Or, when the blend is used, the whole lower lip portions may be formed using this blend. In the former case, the covering layer of this polymer may be provided in the same manner as the covering layer of the upper lip portions and in the latter case, the acid-or salt-modified polymer or a blend thereof may, for example, be extruded to form the lower lip portions. In the present invention, when the molding is entirely made of a blend of the thermoplastic olefinic elastomer and the acid- or salt-modified olefinic polymer, it should be noted that the lower lip portions do not require any particular coating.

The leg portion and flange portion of the molding of the present invention must be soft and flexible. If too soft, however, it becomes difficult to smoothly carry out the mounting operation and the glass cannot be reliably held. It is therefore desired to use a material having a JIS A hardness ranging from 75 to 98 and, particularly, from 80 to 95. In this case, the flange portion and the leg portion may be made of the same material, or the leg portion may be made of a material which is slightly harder than that of the flange portion. An example of such a material is a blend of a thermoplastic olefinic elastomer and an olefin-ethylene type unsaturated carboxylic acid copolymer or a salt thereof. Therefore, the material having JIS A hardness of 75 to 80 forming the leg portion and the flange portion, may be same as that which forms the lip portions. Furthermore, the material having JIS A hardness of 85 to 95 forming the leg portion and the flange portion, may be the same as that which forms the surfaces of the lip portions. When the flange portion is made of a material having JIS A hardness which is smaller than 85, it is necessary to provide a surface layer having a JIS A hardness of greater than 85 like the upper lip portions but its thickness needs not be adjusted as strictly as that of the lip portions.

Figure 3:
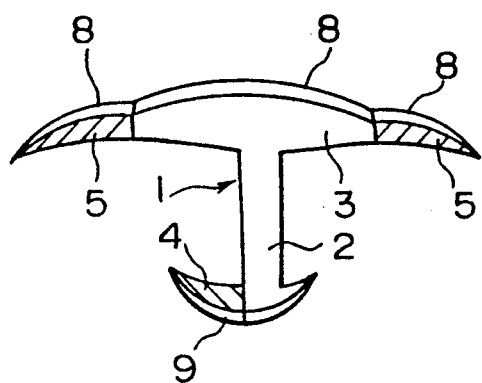
FIG. 3 is a sectional view illustrating a molding for automobile windows of black finish according to an embodiment of the present invention.

Referring to FIG. 3 which shows a molding for automobile windows of the present invention, the leg portion 2, upper lip portions 5 and lower lip portions 4 of the molding (black finish) 1 are made of a composition of the thermoplastic olefinic elastomer or a blend thereof which is further blended with carbon black and having a JIS A hardness of 50 to 80. The upper flange portions 3 and the lip portions 5 thereof are completely covered with a covering layer 8 of the acid- or salt-modified olefinic polymer having a hardness of greater than 85 and a thickness of 1 to 50 μm. Furthermore, a covering layer 9 of the acid- or salt-modified polymer is provided on the surfaces of the lower lip portions 4.

Figure 4:
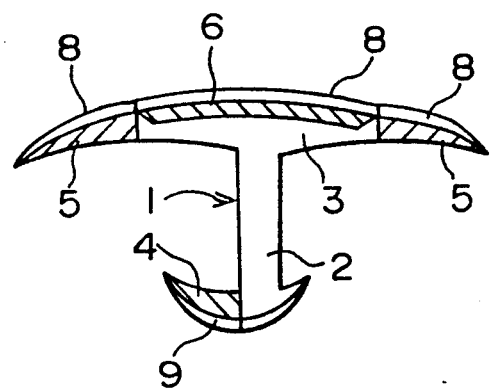
FIG. 4 is a sectional view illustrating a molding for automobile windows of metallic appearance finish according to the embodiment of the present invention.

Referring to FIG. 4 which illustrates another molding (metallic luster finish) for automobile windows of the present invention, the lip portions 4 and 5 are made of the thermoplastic olefinic elastomer, and the covering layers 8 and 9 of the acid- or salt-modified olefin polymer are provided in the same manner as in FIG. 3, except that the metal-deposited film 6 is inserted and buried.

Figure 5:
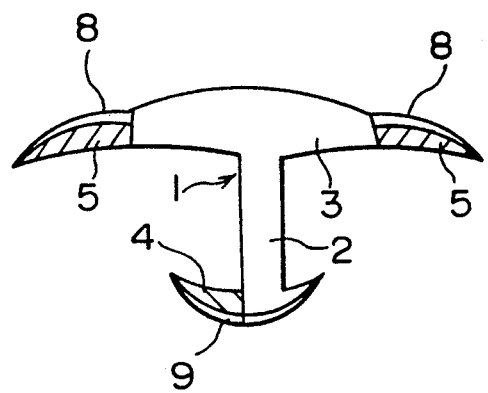
FIG. 5 is a sectional view illustrating a molding for automobile windows of black finish according to another embodiment of the present invention.

FIG. 5 illustrates the molding 1 according to another embodiment of the present invention which is the same as that of FIG. 3 except that no particular covering layer is provided on the upper portion of the flange 3. That is, in this embodiment, the leg portion 2 and flange portion 3 of the molding are made of the same material (hardness, 85 to 95) as the lip covering layer 8, and there is no need of providing the covering on the surface of the flange portion 3.

Figure 6:
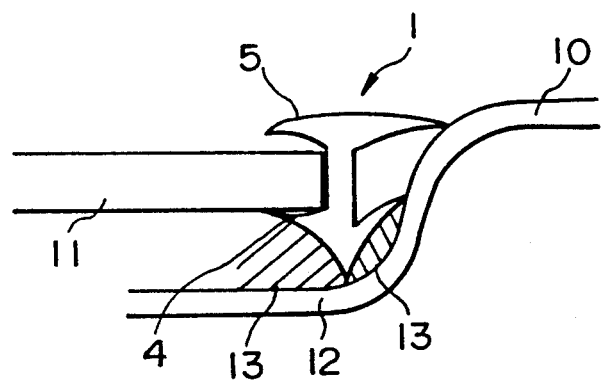
FIG. 6 is a diagram illustrating the condition where the window glass is mounted on the body by using the molding of the present invention.

Referring to FIG. 6 which illustrates the condition where the molding 1 of the present invention is mounted on an automotive body, the window glass 11 is held at its end portion by the upper lip portions 5 and the lower lip portions 4 of the molding, and is firmly adhered to an open flange portion 12 of the body 10 using a polyurethane adhesive 13.

The polymers will now be described below.

Thermoplastic Olefinic Elastomer

This elastomer comprises a peroxide-crosslinking olefin copolymer rubber component and an olefinic plastic component.

(i) Peroxide-Crosslinking Olefin Copolymer Rubber

The peroxide-crosslinking olefin copolymer rubber used in the present invention is an amorphous elastic copolymer comprising an olefin as the main component, such as an ethylene/propylene copolymer rubber, an ethylene/propylene/non-conjugated diene rubber and an ethylene/butadiene copolymer rubber, and a rubber having such a property that if the rubber is mixed with an organic peroxide and kneaded under heating, the flowability is reduced or lost at all is meant. As the non-conjugated diene, there can be mentioned dicyclopentadiene, 1,4-hexadiene, dicyclooctadiene, methylene-norbornene and 5-ethylidene-2-norbornene.

Of these copolymer rubbers, an ethylene/propylene copolymer rubber and an ethylene/propylene/nonconjugated diene rubber are preferably used, and a copolymer rubber in which the molar ratio between ethylene units and propylene units (ethylene/propylene molar ratio) is from 50/50 to 90/10, especially from 55/45 to 85/15, is preferred. An ethylene/propylene/non-conjugated diene copolymer rubber, particularly an ethylene/propylene/5-ethylidene-2-norbornene copolymer rubber or an ethylene/propylene/5-ethylidene-2-norbornene/dicyclopentadiene quadripolymer, is especially preferred because a thermoplastic elastomer excellent in heat resistance, tensile characteristics and repulsion elasticity can be obtained.

In order to obtain a composition excellent in the tensile characteristics and flowability, it is preferred that the Mooney viscosity $ML_{1\cdot 4}$ (100° C.) of the copolymer rubber be 10 to 120, especially 40 to 80.

It also is preferred that the iodine value (unsaturated degree) of the copolymer rubber be smaller than 16. If this requirement is satisfied, a thermoplastic elastomer which is well-balanced between the flowability and the rubber properties can be obtained.

(ii) Olefinic Plastic

The olefinic plastic used in the present invention is a crystalline high-molecular-weight solid product obtained by polymerizing at least one mono-olefin according to the high-pressure method or low-pressure method.

For example, there can be mentioned isotactic and syndiotactic mono-olefin homopolymer and copolymer resins, and typical monoolefin polymer resins are commercially available.

As preferred examples of the monoolefin, there can be mentioned ethylene, propylene, 1-butene, 1-pentene, 1-hexene, 2-methyl-1-propene, 3-methyl-1-pentene, 4-methyl-1-pentene and 5-methyl-1-hexene.

In the present invention, a peroxide-decomposing olefinic plastic and polyethylene are especially preferred as the olefinic plastic.

By the peroxide-decomposing olefinic plastic is meant an olefinic plastic having such a property that if the olefinic plastic is mixed with a peroxide and kneaded under heating, the molecular weight is decreased by thermal decomposition and the flowability of the resin is increased. For example, there can be mentioned isotactic polypropylene and copolymers of propylene with a minor amount of other α-olefin, such as a propylene/ethylene copolymer, a propylene/1-hexene copolymer and a propylene/4-methyl-1-pentene copolymer. It is preferred that the melt index (ASTM D-1238-65T, 230° C.) of the incorporated olefinic plastic be 0.1 to 50, especially 5 to 20. In the present invention, the olefinic plastic exerts the effects of improving the flowability and heat resistance of the elastomer.

The above components (i) and (ii) are indispensable for the olefinic elastomer of the present invention and are usually contained at a weight ratio (i):(ii) of from 20:80 to 95:5, and particularly from 30:70 to 80:20.

In order to improve adhesiveness, this elastomer may contain the following components bonded thereto.

(iii) Unsaturated Carboxylic Acid or Derivative Thereof, Unsaturated Epoxy Monomer or Unsaturated Hydroxy Monomer In the present invention, as the unsaturated carboxylic acid or derivative thereof as the component (iii), there can be used α,β-unsaturated carboxylic acids such as acrylic acid, methacrylic acid, maleic acid, fumaric acid, itaconic acid, citraconic acid and tetrahydrophthalic acid, unsaturated carboxylic acids such as bicyclo(2,2,1)hept-2-ene-5,6-dicarboxylic acid, α,β-unsaturated carboxylic anhydrides such as maleic anhydride, itaconic anhydride, citraonic anhydride and tetrahydrophthalic anhydride, unsaturated carboxylic anhydrides such as bicyclo(2,2,1)hept-2-ene-5,6-dicarboxylic anhydride, and unsaturated carboxylic acid esters such as methyl acrylate, methyl methacrylate, dimethyl maleate, monomethyl maleate, diethyl fumarate, dimethyl itaconate, diethyl citraconate, dimethyl tetrahydrophthalate and dimethyl bicyclo(2,2,1)hept-2-ene-5,6-dicarboxylate. Of these compounds, maleic acid, bicyclo(2,2,1)hept-2-ene-5,6-dicarboxylic acid and anhydrides thereof are preferred.

As the unsaturated epoxy monomer used as the component (iii) in the present invention, there can be mentioned, for example, glycidyl esters of unsaturated monocarboxylic acids such as glycidyl acrylate, glycidyl methacrylate and glycidyl p-styrylcarboxylic acid, monoglycidyl and diglycidyl esters of unsaturated polycarboxylic acids such as maleic acid, itaconic acid, citraconic acid, butene-tricarboxylic acid, endo-cisbicyclo (2,2,1)hept-5-ene-2,3-dicarboxylic acid, endo-cisbicyclo (2,2,1)hept-5-ene-2-methyl-2,3-dicarboxylic acid, unsaturated glycidyl ethers such as allylglycidyl ether, 2-methylallylglycidyl ether, o-allylphenyl glycidyl ether, m-allylphenyl glycidyl ether, m-allylphenyl glycidyl ether, isopropenylphenyl glycidyl ether, o-vinylphenyl glycidyl ether, m-vinylphenyl glycidyl ether and p-vinylphenyl glycidyl ether, and 2-(o-vinylphenyl)-ethylene oxide, 2-(p-vinylphenyl)-ethylene oxide, 2-(o-vinylphenyl)propylene oxide, 2-(p-vinylphenyl)-propylene oxide, 2-(o-allylphenyl)-ethylene oxide, 2-(p-allylphenyl)ethylene oxide, 2-(o-allylphenyl)-propylene oxide, 2-(p-allylphenyl)-propylene oxide, p-glycidylstyrene, 3,4-epoxy-1-butene, 3,4-epoxy-3-methyl-1-butene, 3,4-epoxy-3-methyl-3-methyl-1-butene, 3,4-epoxy-1-pentene, 3,4-epoxy-3-methyl-1-pentene, 5,6-epoxy-1-hexene, vinylcyclohexene mono-oxide and allyl-2,3-epoxycyclopentyl ether.

The unsaturated hydroxy monomer as another component (iii) is a monomer having at least one ethylenic unsaturated bond and at least one hydroxyl group. For example, there can be mentioned hydroxyethyl acrylate, hydroxypropyl acrylate, hydroxyethyl methacrylate, hydroxypropyl methacrylate, polyethylene glycol monomethacrylate and polypropylene glycol monomethacrylate. Hydroxyethyl (meth)acrylate and hydroxypropyl (meth)acrylate are especially preferred.

The polar group (functional group)-containing monomers can be used in amounts of from 0.01 to 10 parts by weight and, particularly, in amounts of from 0.1 to 5 parts by weight per 100 parts by weight of the elastomer.

The olefinic elastomer used in the present invention is obtained by mixing the aforementioned components (i) and (ii) and, as required, the aforementioned component (iii) together, and then dynamically heat-treating them in the presence of an organic peroxide, i.e., by melt-kneading them together. The kneading is carried out, generally, at a temperature of 170° to 280° C. and, particularly, 170° to 240° C. for a period of 1 to 20 minutes and, particularly, 1 to 10 minutes. Any organic peroxide can be used, such as 2,5-dimethyl-2,5-di-(tert-butylperoxy)hexane, 2,5-dimethyl-2,5-di-(tert-butylperoxy)-hexine-3 1,3-bis (tertbutylperoxyisopropyl)benzene, 1,1-bis(tert-butylperoxy)-3,3,5-trimethylcyclohexane, n-butyl-4,4-bis(tert-butylperoxy)valerate, or 1,3-bis(tert-butylperoxyisopropyl)benzene in an amount of from 0.05 to 3% by weight and, particularly, in an amount of 0.1 to 1% by weight with respect to the composition.

In producing the olefinic elastomer, furthermore, it is allowable to blend, as required, a noncrosslinking elastomer such as polyisobutylene, a softening agent such as mineral oil, and a fibrous or powdery filler.

Examples of the olefinic thermoplastic elastomer or a modified product thereof include those which are placed in the market in the trade names of Milastomer, Thermolan, Sumitomo TPE, Santoprene, and Goodmer, and which are easily available in the market.

Acid- or Salt-Modified Polymer

The acid- or salt-modified polymer used in the present invention comprises a random copolymer, a block copolymer, a graft copolymer, or a metal or amine neutralized product (salt) of these copolymers containing olefin components such as ethylene and propylene, ethylenically unsaturated carboxylic acid components such as acrylic acid, methacrylic acid, maleic anhydride, fumaric acid, itaconic acid, and ester of monoethyl maleate, and, as required, ester components of (meth)acrylic acid such as ethyl acrylate and methyl methacrylate, as polymer chains.

The content of the ethylenically unsaturated carboxylic acid unit should range from 0.5 to 10 mol %, and particularly from 1 to 7 mol %. The content of the ester of (meth)acrylic acid unit should generally be smaller than 20 mol % and, particularly smaller than 15 mol %.

Examples of the acid-modified polymer include an ethylene-(meth)acrylic acid random copolymer, a (meth)acrylic acid-grafted polyethylene and a maleic anhydride-grafted polyethylene.

Examples of the cations contained in the salt-modified polymer include alkali metal ions such as Na+, K+, alkaline earth metal ions such as $Ca^{++}$, $Mg^{++}$, transition metal ions such as $Mn^{++}$, $Co^{++}$, $Ni^{++}$, $Cu^{++}$ and $Zn^{++}$, as well as ammonium ions and various amine cations. Suitable salt-modified olefin polymers can be obtained in the trade names of Himilan and Surlyn.

It is desired that the acid- or salt-modified olefin polymer used in the present invention has a meltflow rate (ASTM D1238) of 0.01 to 100 g/10 min, and particularly 0.05 to 50 g/10 min. When used for covering the upper lip portions, it is essential that the acid- or salt-modified olefin polymer has a JIS A hardness of greater than 85. It should, however, be noted that there is no particular limitation when the acid- or salt-modified olefin polymer is used for covering or forming the lower lip portions.

Polymer Composition for Forming the Molding

The molding which includes the leg portion and the flange portion is obtained by using a composition of the aforementioned thermoplastic olefinic elastomer and the acid- or salt-modified olefin polymer. Here, it is desired that the olefinic elastomer and the acid- or salt-modified olefin polymer are used being blended together at a weight ratio of from 10:90 to 60:40 and, particularly from 20:80 to 50:50.

The upper lip portions and the lower lip portions are formed by using the thermoplastic olefinic elastomer alone or by using a composition of this olefinic elastomer and the acid- or salt-modified olefin polymer. In the latter case, the olefinic elastomer and the acid-or salt-modified olefin polymer are used being blended together at a weight ratio of from 40:60 to 99:1 and, particularly from 55:45 to 90:10.

Polymer Composition for Forming Covering

The upper lip portions can be covered by using the acid- or salt-modified polymer alone, as a matter of course. In order to further improve resistance against the wax remover, however, the modified polymer may be used being blended with other polymers.

Examples of the polymer with which the modified polymer is blended include polyamides such as nylon 6, nylon 6,6, nylon 6/nylon 6,6 copolymer, nylon 6,10, nylon 6,12, nylon 11, nylon 12, methaxylidene adipamide, and polyamide-type elastomers which have in the molecular chains thereof polyether groups such as polyoxyethylene unit, polyoxypropylene unit or polyoxytetramethylene unit, or have in the molecular chains thereof polyester groups such as polyethylene adipate unit, or polyethylene sebacamide unit. They may be not be only of the molding grade but may also of the oligomer-like ones.

The polyamides should be blended in amounts of from 1 to 30% by weight, and particularly from 5 to 25% by weight with respect to the composition to markedly improve resistance against the wax remover. Graft bonding or block bonding may take place, as a matter of course, between the blended polyamides and the acid- or salt-modified olefin polymer.

Another polymer with which the modified polymer is blended may be the thermoplastic olefinic elastomer that was mentioned above in detail. When blended in an amount of 5 to 40% by weight, and particularly in an amount of 10 to 30% by weight with respect to the composition, the olefinic elastomer exhibits distinguished resistance against the wax remover.

The invention will now be described by way of examples.

EXAMPLES

Physical properties were evaluated as described below.

1. Scratch Resistance

The molding for automotive applications according to the present invention was washed using an automatic car washer installed in a gas station, and scratches caused by nylon brushes were observed by eyes.

2. Luster

The luster of the extruded surface of the automotive molding of the present invention was evaluated by eyes.

3. Adhesiveness

The automotive molding of the present invention was wiped with an isopropyl alcohol, dried for 10 minutes, and a primer (PP2 produced by Sunstar Giken Co.) was applied thereto. After an open time of 60 minutes, the molding was press-adhered while using a sealant (Penguin seal No. 551 produced by Sunstar Giken Co.). After even days in an environment of 20° C. and 65% RH, the adhesiveness was evaluated based on the 180-degree peeling.

4. Resistance Against the Wax Remover

A wax remover (a mixture solution of kerosene and hot water) of a temperature of 80° C. was injected to wash the automotive molding of the present invention from a distance of 10 cm for 10 seconds by using a car washer of removing the anti-corrosion wax. The surface of the molding was observed by eyes.

EXAMPLE 1

An ethylene-methacrylic acid copolymer (methacrylic acid 9% by weight, 3 dg/min, hereinafter referred to as EMAA-1), an olefinic thermoplastic elastomer (Milastomer 8032 N, JIS A hardness 80, produced by Mitsui Petrochemical Co., hereinafter referred to as TPO-1) and a carbon master batch (amount of carbon black 30% by weight, ethylene vinyl acetate as a base, hereinafter referred to as CMB-1) were mixed together at a weight ratio of 80:20:10. The mixture was fed to a screw-type monoaxial extruder (screw diameter 40 mm, L/D=28), melted and kneaded at a resin temperature of 180° C., and the strand coming out from the extruder was cut and pelletized.

The obtained pellets possessed a hardness of 93 (JIS A hardness).

Moreover, an ethylene-methacrylic acid-isobutyl acrylate copolymer (methacrylic acid 10% by weight, isobutyl acrylate 10% by weight, 10 dg/min, hereinafter referred to as EMAA-2), an olefinic thermoplastic elastomer (Milastomer 5530N, JIS A hardness 55, produced by Mitsui Petrochemical Co., hereinafter referred to as TPO-2) and carbon master batch (CMB-1) were mixed together at a weight ratio of 30:70:10. The mixture was fed to the screw-type monoaxial extruder (screw diameter 40 mm, L/D=28), melted and kneaded at a resin temperature of 180° C., and the strand coming out from the extruder was cut and pelletized.

The obtained pellets possessed a hardness of 71 (JIS A hardness).

The two kinds of pellets that are obtained were fed to the screw-type monoaxial extruder (screw diameter 40 mm, L/D=28) and to another screw-type monoaxial extruder (screw diameter 20 mm, L/D=22), equipped with a dies for two-layer different-shape extrusion, and were two-layer extrusion-molded into an automotive molding at a die temperature of 200° C.

The pellets of the hardness of 93A (JIS A hardness) are located at 2-8-9 in FIG. 3 and the pellets of the hardness of 71A (JIS A hardness) are located at 3-4-5 in FIG. 3.

The obtained automotive molding was evaluated for its scratch resistance, luster, adhesion property and resistance against the wax remover. The results were as shown in Table 1.

EXAMPLE 2

The EMAA-2, an olefinic thermoplastic elastomer (Milastomer 5030N, JIS A hardness 50, produced by Mitsui Petrochemical Co., hereinafter referred to as TPO-3) and carbon master batch (CMB-1) were mixed together at a weight ratio of 30:70:10. The mixture was fed to the screw-type monoaxial extruder (screw diameter 40 mm, L/D =28), melted and kneaded at a resin temperature of 180° C., and the strand coming out from the extruder was cut and pelletized.

The obtained pellets possessed a hardness of 61 (JIS A hardness).

The pellets having the hardness of 93 of Example 1 and the above pellets were fed to the screw-type monoaxial extruder (screw diameter 40 mm, L/D=28) and to the screw-type monoaxial extruder (screw diameter 20 mm, L/D=22) equipped with the dies for two-layer different-shape extrusion, and were two-layer extrusion-molded into an automotive molding at a die temperature of 200° C.

The polymer having the hardness of 93A (JIS A hardness) are located at the leg 2 and the flange 3 in FIG. 5, and the polymer having the hardness of 61A (JIS A hardness) are located at the lips 4 and 5 in FIG. 5.

The obtained automotive molding was evaluated for its scratch resistance, luster, adhesion property and resistance against the wax remover. The results were as shown in Table 1.

EXAMPLE 3

An ethylene-methacrylic acid copolymer (EMAA-1), the olefinic thermoplastic elastomer (TPO-3) and the carbon master batch (CMB-1) were mixed together at a weight ratio of 30:70:10. The mixture was fed to the screw-type monoaxial extruder (screw diameter 40 mm, L/D =28), melted and kneaded at a resin temperature of 180° C., and the strand coming out from the extruder was cut and pelletized.

The obtained pellets possessed a hardness of 80 (JIS A hardness).

The pellets having hardnesses 93 and 61 of Examples 1 and 2, and the above pellets were fed to the screwtype monoaxial extruder (screw diameter 40 mm, L/D=28) and to two screw-type monoaxial extruder (screw diameter 20 mm, L/D=22) equipped with dies for three-layer different-shape extrusion, and were three-layer extrusion-molded into an automotive molding at a dies temperature of 200° C.

The pellets having the hardness of 93A (JIS A hardness) are located at 8-9 in FIG. 3, the pellets having the hardness of 80 A (JIS A hardness) are located at 2-3 in FIG. 3, and the pellets having the hardness of 61A (JIS A hardness) are located at 4-5 in FIG. 3.

The obtained automotive molding was evaluated for its scratch resistance, luster, adhesion property and resistance against the wax remover. The results were as shown in Table 1.

TABLE 1

| Properties of molding | Example 1 | Example 2 | Example 3 |
| --- | --- | --- | --- |
| Scratch resistance | no abnormality | no abnormality | no abnormality |
| Luster | good | good | good |
| Adhesion property | good | good | good |
| Resistance against wax remover | no abnormality | no abnormality | no abnormality |

We claim:

1. A molding for mounting a window glass on a window opening of an automotive body, said molding comprising:
   a flexible leg portion having a first side and a second side and having an upper part and a lower part,
   an upper flange portion, contiguous with said leg portion, which extends outwardly from both sides of said leg portion at said upper part of the leg portion, said upper flange portion being supportably engageable of an edge portion of a window glass,
   a first upper lip portion, having an outer surface, formed as a tip of said upper flange portion on said first side of said leg portion,
   a second upper lip portion, having an outer surface, formed as a tip of said upper flange portion on said second side of said leg portion, and
   lower lip portion, having lower surfaces, formed on said lower part of said leg portion and extending outwardly from both sides of said leg portion, said lower lip portions being engageable of and supportable by an automotive body adjacent to a window opening of the automotive body, wherein
   at least the upper lip portions and the lower lip portions of said molding are formed by using a thermoplastic olefinic elastomer or a composition of said elastomer and an olefin-ethylene unsaturated carboxylic acid copolymer or a salt thereof having a hardness in compliance with JIS A of from 50 to 80,
   said leg portion and said upper flange portion are formed by using a blend of the thermoplastic olefinic elastomer and the olefin-ethylene unsaturated carboxylic acid copolymer or a salt thereof, said blend having a hardness in compliance with JIS A of from 75 to 95,
   the outer surfaces of the upper lip portions are covered with a layer which contains the olefin-ethylene unsaturated carboxylic acid copolymer or a salt thereof and having a thickness of 1 to 50 μm and a hardness in compliance with JIS A of greater than 85, and
   at least the lower surfaces of the lower lip portions are formed by using the olefin-ethylene unsaturated carboxylic acid copolymer or a salt thereof or a polymer composition containing them.

2. A molding according to claim 1, wherein the thermoplastic olefinic elastomer forming the lip portions comprises a polymer which contains hard segments of olefinic plastic and soft segments of olefinic polymer rubber at a weight ratio of from 5:95 to 80:20, the soft segments being at least partially crosslinked.

3. A molding according to claim 1, wherein the leg portion and the flange portion of the molding are formed by using a blend that contains the thermoplastic olefinic elastomer and the olefin-ethylene unsaturated carboxylic acid copolymer or a salt thereof at a weight ratio of from 10:90 to 60:40.

4. A molding according to claim 1, wherein the olefin-ethylene unsaturated carboxylic acid copolymer or a salt thereof contains the ethylenically unsaturated carboxylic acid unit in an amount of 0.5 to 10 mol%.

5. A molding according to claim 1, wherein the layer covering the outer surfaces of the upper lip portions is formed by using a blend which contains the olefin-ethylene unsaturated carboxylic acid copolymer or a salt thereof and a polyamide in an amount of 1 to 30% by weight with respect to the blend.

6. A molding according to claim 1, wherein the layer covering the outer surfaces of the upper lip portions is formed by using a blend which contains the olefin-ethylene unsaturated carboxylic acid copolymer or a salt thereof and the thermoplastic olefinic elastomer in an amount of 5 to 40% by weight with respect to the blend.

7. A molding according to claim 1, wherein the lip portions of the molding are formed by using a blend which contains the thermoplastic olefinic elastomer and the olefin-ethylene unsaturated carboxylic acid copolymer or a salt thereof at a weight ratio of from 40:60 to 99:1.

* * * * *